A. M. BRISTOL.
Tea Pot.
No. 39,115.
Patented July 7, 1863.
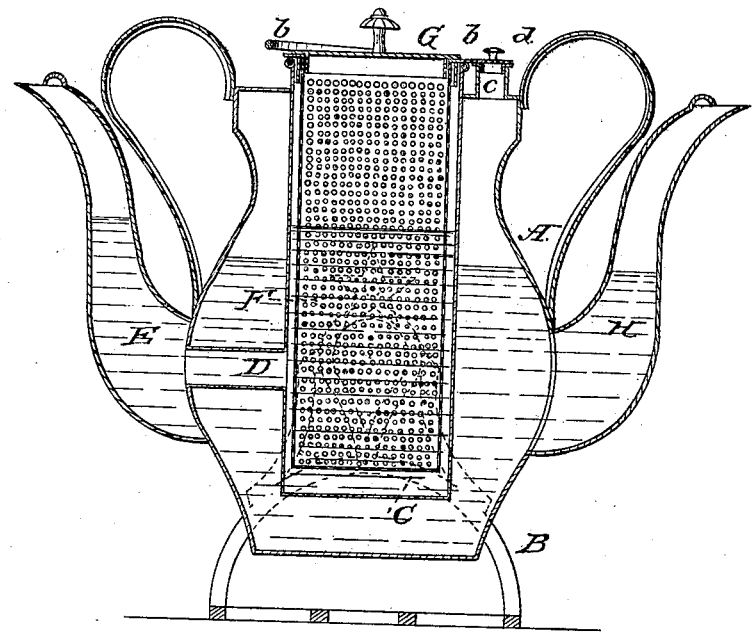
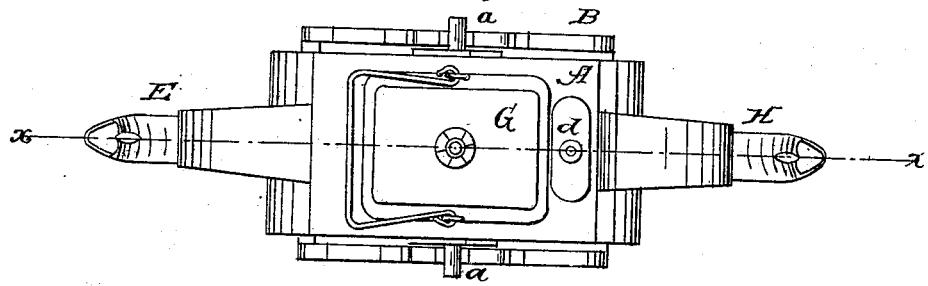

UNITED STATES PATENT OFFICE.

ALEX. M. BRISTOL, OF DETROIT, MICHIGAN.

IMPROVEMENT IN TEA-POTS.

Specification forming part of Letters Patent No. 39,115, dated July 7, 1863.

*To all whom it may concern:*

Be it known that I, ALEXANDER M. BRISTOL, of Detroit, in the county of Wayne and State of Michigan, have invented a new and useful Combination of a Tea-Pot and Water-Urn; and I do hereby declare that the following is a full, clear, and exact description of the same, reference being had to the accompanying drawings, making a part of this specification, in which—

Figure 1 is a vertical central section of my invention, taken in the line x x, Fig. 2; Fig. 2, a plan or top view of the same.

Similar letters of reference indicate corresponding parts in the two figures.

This invention consists in having a suspended tilting vessel composed of two separate compartments—one for the tea and the o her for hot water—and having each compartment provided with a spout, whereby both tea and hot water may be obtained from the same vessel, and the tea kept at a proper warm temperature by the hot water, which receives its heat from a lamp underneath the vessel.

To enable those skilled in the art to fully understand and construct my invention, I will proceed to describe it.

A represents a vessel, which may be constructed of any suitable material; metal, however, will be most generally used. This vessel is provided with a journal or trunnion, a, at each side of it, and is suspended in a frame, B, so that it may be readily tilted either to the right or left.

Within the vessel A there is a compartment, C, which extends down from the top of A, but has no communication with the interior of it. The compartment C communicates by means of a tube, D, with a spout, E, which is attached to one side of A. This will be fully understood by referring to Fig. 1, in which the contents of the compartment is shown in red lines. Within the compartment C there is placed a perforated tea-holder, F, which is provided at its upper end with horizontal flanges b, which rest on the top of the compartment C. The tea-holder F is provided with a cover, G.

H is a spout, attached to the side of the vessel opposite to that where the spout E is attached. This spout communicates with the interior of A, as shown in Fig. 1. The upper end of the vessel A is provided with a small neck, c, having a lid or stopper, d.

The device is used as follows: The compartment C in the vessel A is supplied with boiling water, and the holder F has a requisite quantity of tea placed in it. The vessel A is then supplied with boiling water, which is kept in a proper warm state by means of a spirit-lamp placed underneath it. The tea in the compartment C and holder F is kept in a warm state by the water in A, while the aroma of the tea is preserved, all covers and lids being closed, and the tea while being kept warm is prevented from boiling, which drives off the aroma. The tea is poured from the spout E and the hot water from the spout F.

In consequence of having the vessel A suspended in a frame, B, so that it may be tilted either to the right or left, either hot water or tea may be readily poured from the vessel, as desired. This renders the device extremely convenient, preventing the necessity of moving the frame B in any case in order to pour hot water or tea from it, the tilting of the vessel on its frame being only required.

Having thus described my invention, I claim as new and desire to secure by Letters Patent, as an improved article of manufacture—

A tea-pot and water-urn arranged and combined in manner substantially as set forth.

ALEX. M. BRISTOL.

Witnesses:
EUGENE FEIHT,
JNO. I. D. BRISTOL.